United States Patent
Blakely

(10) Patent No.: US 6,942,052 B1
(45) Date of Patent: Sep. 13, 2005

(54) SNOWMOBILE EXHAUST EXIT

(75) Inventor: Gary C. Blakely, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/948,964

(22) Filed: Sep. 24, 2004

(51) Int. Cl.⁷ .............................................. B62M 29/00
(52) U.S. Cl. ...................... 180/190; 180/68.3; 180/309
(58) Field of Search ................................ 180/190, 186, 180/182, 309, 68.3, 89.2, 9.21, 9.1, 9, 9.25, 180/185; 440/89 R; 60/313

(56) References Cited

U.S. PATENT DOCUMENTS

| | | | |
|---|---|---|---|
| 5,586,614 A | * 12/1996 | Kouchi et al. ............... | 180/190 |
| 5,904,217 A | * 5/1999 | Yamamoto et al. .......... | 180/193 |
| 6,227,323 B1 | * 5/2001 | Ashida ......................... | 180/190 |
| 6,802,383 B2 | 10/2004 | Nishijima | |
| 6,808,034 B2 | 10/2004 | Nakano et al. | |

OTHER PUBLICATIONS

Color Photograph of Arctic Cat 1970 Panther Snowmobile (1pg.).
Color Photograph of Arctic Cat 1970 Puma Snowmobile (1pg.).

* cited by examiner

Primary Examiner—Tony Winner
(74) Attorney, Agent, or Firm—Darren J. Jones; Black Lowe & Graham

(57) ABSTRACT

A snowmobile including a chassis, a body secured to the chassis, a ski suspension, an engine, an exhaust pipe, a resonator, and an outlet pipe. The body includes a belly pan. The ski suspension is mounted to the chassis. The belly pan forms a suspension well around at least a portion of the ski suspension. The engine is mounted to the chassis and includes an exhaust exit port. The exhaust pipe is mounted to the exhaust exit port. The resonator is secured to the chassis and in fluid communication with the exhaust pipe. The outlet pipe is secured to a forward side of the resonator and extends through the rearward side of the suspension well, rearward of the suspension. The terminal end of the outlet pipe is directed downwardly and includes a deflector shield thereabout. A heat shield is also secured to the belly pan below the terminal end of the outlet pipe.

16 Claims, 4 Drawing Sheets

SNOWMOBILE EXHAUST EXIT

FIELD OF THE INVENTION

This invention relates generally to snowmobile exhaust systems and, more specifically, to an exhaust exit location from an exhaust resonator in a snowmobile.

BACKGROUND OF THE INVENTION

Advances in snowmobile technology have included electronic fuel injection, larger engines, and lighter weights. Some long-track snowmobiles develop more than 150 horsepower while weighing less than 500 pounds. Electronic fuel injection allows easy starts, consistent power, smooth idling regardless of elevation or temperature, and a light throttle pull. Improved engine performance and power-to-weight ratios have enabled snowmobiles with wide skis and long tracks to move through deep and steep snow.

However, certain snow conditions may hinder the exit of exhaust gases conventionally channeled out the bottom of the belly pan. The situation is compounded with larger engines; more air and fuel moves in and out of the engine. Thus, if the exhaust exit is blocked by snow, engine performance suffers. This phenomenon is known as "Capping off".

Such blockages are more likely to occur in deep, non-compacted snow conditions into which today's lighter, more powerful snowmobiles may enter. The bottom of the belly pan may slide through non-compacted snow, or snow may restrict the exhaust exit port area under certain conditions of snow temperature, density, and moisture content. Either of these scenarios may restrict flow of exhaust gases, robbing the engine of power. The problem is amplified with a right-hand turn, as the under-belly outlet is typically under the right side of the snowmobile. The outlet is stuffed into the snow. This increases the back pressure of the exhaust system and causes the snowmobile engine to bog down and die out.

Attempts to maintain open flow have focused on deflecting the snow away from the outlet under the belly pan. However, the deflectors don't eliminate the "capping off" problem in deep snow, especially with a right-hand turn. Therefore, a need exists for an unrestricted exhaust exit port under all snow and riding conditions.

SUMMARY OF THE INVENTION

The present invention provides an exhaust system for a snowmobile having a ski suspension and an engine with exhaust ports. The exhaust system includes a suspension well and an exhaust outlet pipe. The ski suspension is disposed at least partially within the suspension well. The well has a face positioned adjacent at least a portion of the ski suspension, with an opening formed in the face. The exhaust outlet pipe is in fluid communication with the exhaust ports of the engine. The outlet pipe extends through the opening formed in the face of the well.

In accordance with one aspect of the invention, the face of the suspension well is a rearward face positioned adjacent to and rearward of at least a portion of the ski suspension.

A further aspect of the invention includes a downwardly directed deflection shield. This shield is secured within the suspension well. The shield covers at least a portion of the exhaust outlet pipe. In the preferred embodiment, the outlet pipe extends adjacent to the ski suspension. The pipe includes a terminal end with an opening directed downwardly. A heat shield is secured within the suspension well. The heat shield is positioned below the terminal end of the outlet pipe.

The invention may also be described as a snowmobile having a chassis, a body, a ski suspension, an engine, an exhaust pipe, a resonator, and an outlet pipe. The body is secured to the chassis and includes a belly pan. The ski suspension is mounted to the chassis with the belly pan forming a suspension well around at least a portion of the ski suspension. The engine is mounted to the chassis and includes an exhaust exit port. The exhaust pipe is mounted to the exhaust exit port. The resonator is secured to the chassis and is in fluid communication with the exhaust pipe. The outlet pipe is secured to a forward side of the resonator. The outlet pipe extends through the rearward side of the suspension well, rearward of the suspension.

In a further refined aspect of the invention, the outlet pipe includes a terminal end adjacent to the ski suspension.

In accordance with further aspects of the invention, a suspension well includes a rearward face behind the ski suspension. The rearward face includes an opening therein through which the outlet pipe extends. The outlet pipe is directed downwardly so as to channel exhaust gases between the belly pan and the ski suspension.

In accordance with yet a further aspect of the invention, a deflector shield is secured to the belly pan and surrounds a portion of the outlet pipe that extends into the suspension well. In this embodiment, a heat shield is also secured to the belly pan below the terminal end of the outlet pipe.

In accordance with further aspects of the invention, an exhaust pipe for a snowmobile is provided. The snowmobile includes ski suspension linkages, an engine, and an exhaust system. The ski suspension linkages are disposed within a belly-pan suspension well. The engine includes an exhaust port. The exhaust system includes an expansion pipe coupled to the exhaust port and a resonator coupled to the expansion pipe. The resonator has a front side adjacent to, and rearward of, the belly pan suspension well. The exhaust pipe includes a pipe coupled to the front side of the resonator and extending through the belly pan to a terminal end. The terminal end is within the suspension well adjacent to the ski suspension linkages.

In a further refinement of the invention, the exhaust pipe is curved downwardly at its terminal end to channel exhaust gases downwardly between the belly pan and the ski suspension linkages.

The invention thus described provides the advantages of avoiding capping off of the exhaust exit port that may be caused when the snowmobile is run in deep snow, especially during turns.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENTS

Figure 1:
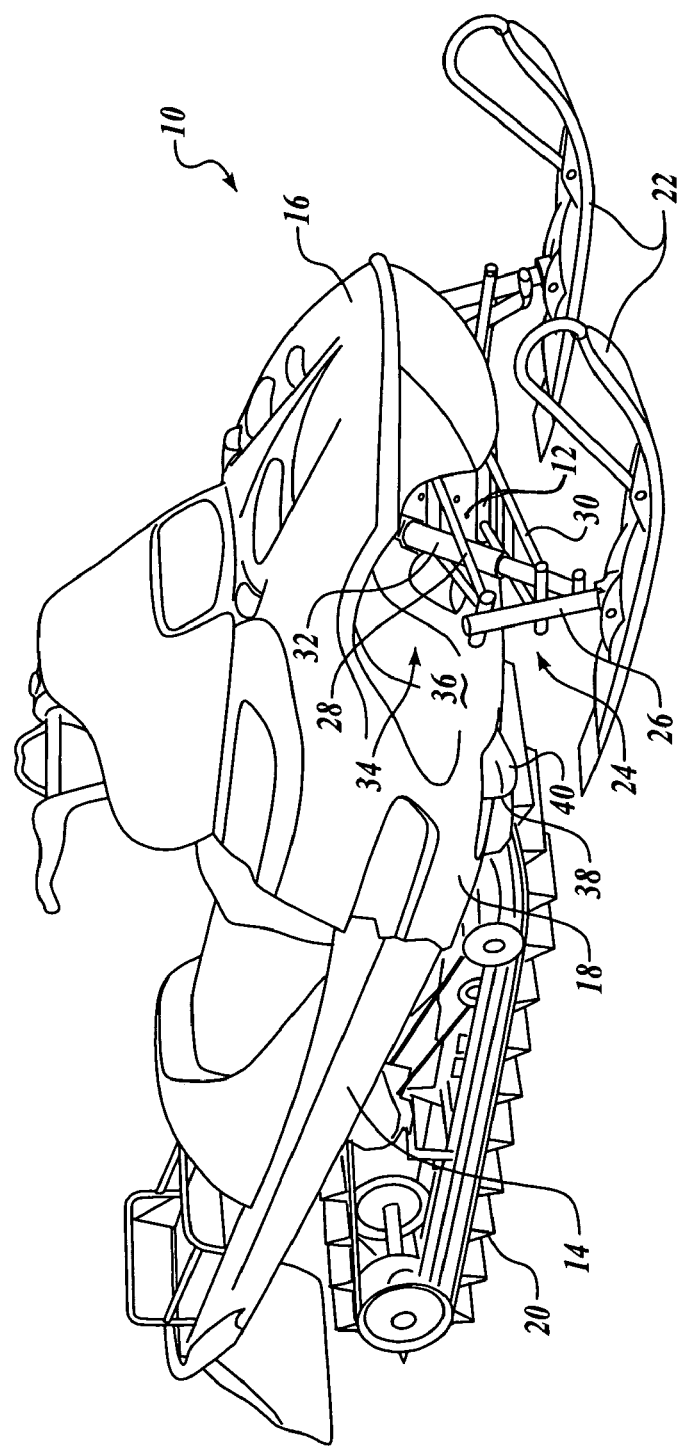
FIG. 1 is a perspective view of a prior-art snowmobile with a belly pan exhaust exit.

Referring first to FIG. 1, a prior-art snowmobile 10 is illustrated. The snowmobile illustrated is the type used in deep snow. Such a snowmobile 10 includes a chassis 12 and a body 16. Tunnel 14 is part of chassis 12, extending rearward from an engine-holding portion of chassis 12 to support a seat and to provide a framework for the attachment of a track 20. A belly pan 18 is provided as part of body 16 secured generally to the underside of the forward portion of snowmobile 10. Skis 22 are secured to the front of snowmobile 10 and provide the steering function. Ski suspensions 24 link chassis 12 to skis 22 and may be of numerous alternative configurations. In the embodiment shown here, ski suspension 24, includes a spindle 26, which attaches to ski 22. Spindle 26 is secured to chassis 12 with upper and lower A-arms 28 and 30. A shock absorber 32 also extends between spindle 26 and chassis 12 to absorb impacts encountered by the skis.

Ski suspension 24 is generally disposed within a recess in belly pan 18 that forms a suspension well 34. Suspension well 34 allows for the up and down movement of A-arms 28 and 30 with spindle 26 attached thereto. Suspension well 34 includes a rearward face 36 that protects the engine and exhaust components from snow and other foreign matter. An exhaust exit 38 with a deflector 40 extends through the underside of belly pan 18 rearward of suspension well 34.

When snowmobile 10 is used on compacted snow such as on a trail, no capping off of exhaust exit 38 occurs since deep snow is not encountered and deflector 40 is able to stop any snow from clogging exhaust exit 38 as the snow may be sprayed up from skis 22. However, in deep snow, capping off obstruct exhaust gas exit. As snowmobile 10 moves through deep snow, especially noncompacted deep snow, the snow may stick to the underside of belly pan 18 or may simply be deep enough to slide along the underside of belly pan 18, thus not allowing proper escape of exhaust gases through exhaust exit 38. This may especially be a problem when snowmobile 10 is in a right-hand turn such that belly pan 18 is moving laterally into the snow without ski 22 deflecting the snow from pressing against exhaust exit 38. Snow impedes exhaust exit and bogs down the engine, maybe even to the point of the engine dying. Without proper exhaust gas escape, back pressure is created in the exhaust system impeding proper flow of gases through the entire engine. Such engines may be two-stroke engines with fuel injection, two-stroke engines with carburetors, and four stoke engines both fuel injected and carbureted. These engines move large volumes of gases in and out of the engines for proper performance. These engines are typical with such snowmobiles intended for riding in powder snow conditions that need increased horsepower to move through the deep light snow and to climb steep slopes in such conditions. The exhaust exit through the bottom of the belly pan also helps attenuate noise from the exhaust and engine.

Figure 2:
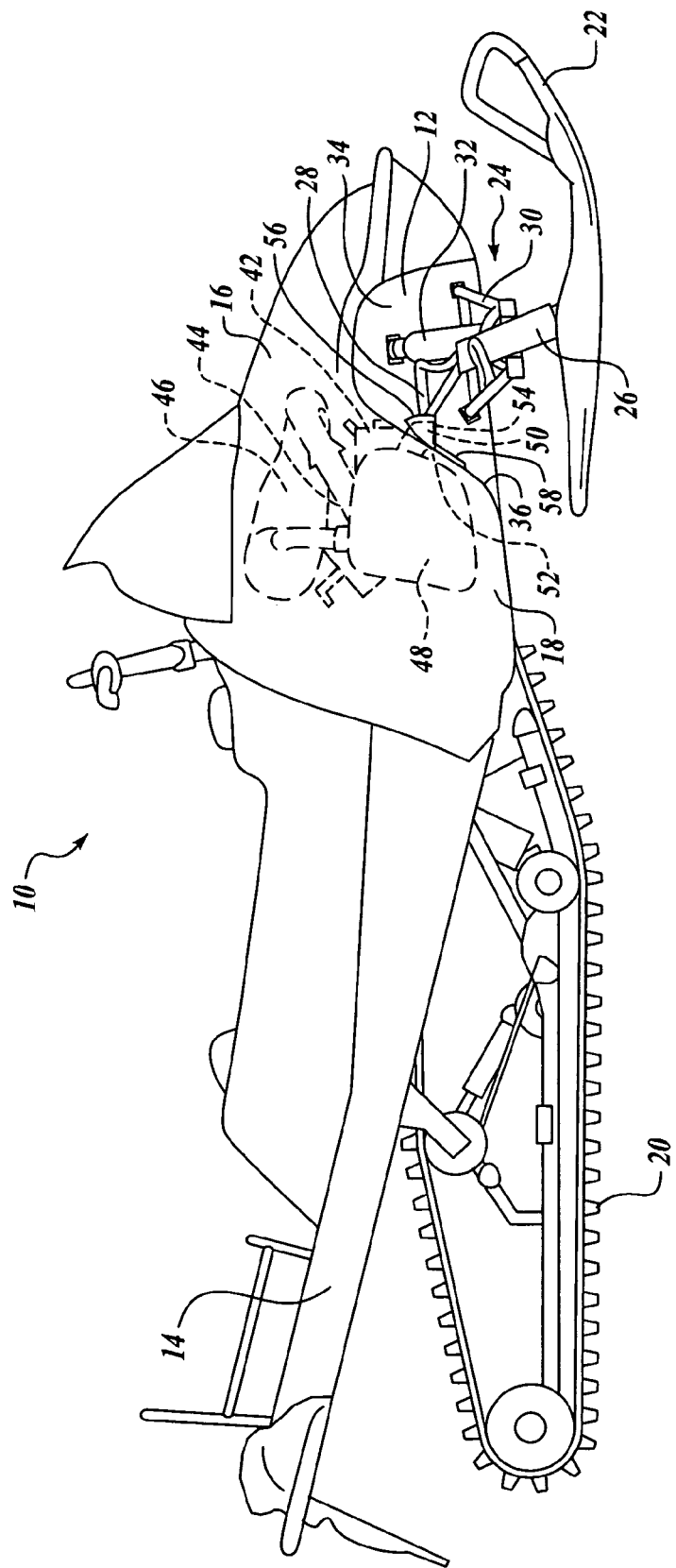
FIG. 2 is a side view of the exhaust system of the present invention showing a portion of the exhaust system in phantom view through the snowmobile body.
Figure 3:
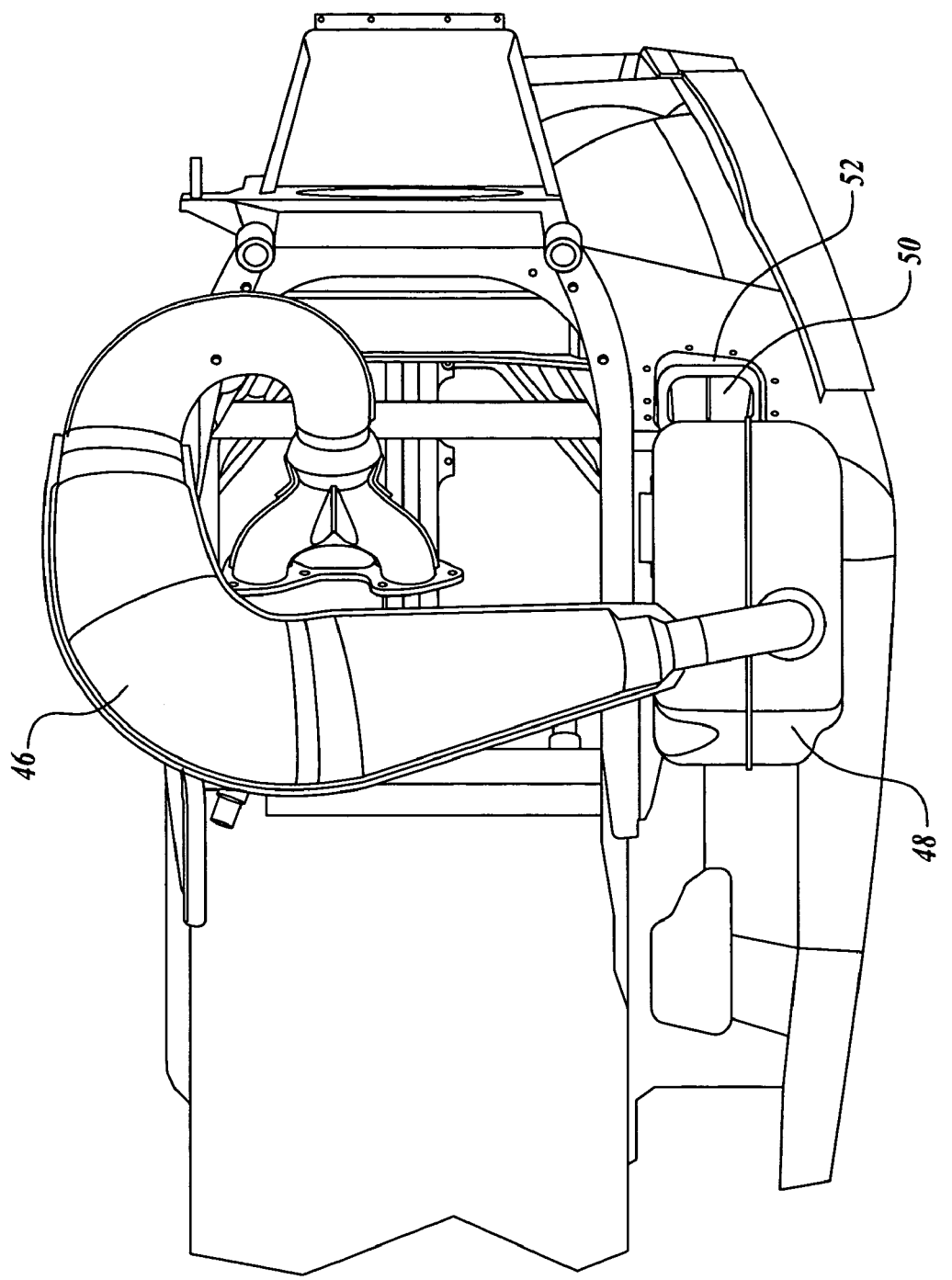
FIG. 3 is a top view of the exhaust system of the present invention shown in relation to the snowmobile chassis and a portion of the body.

Turning now to FIG. 2, the exhaust system of the present invention will be described. Throughout this description, like numbering from FIG. 1 indicates like components. FIG. 2 includes a snowmobile 10 with a chassis 12, tunnel 14, body 16, belly pan 18, track 20, and skis 22 similar to that described in connection with FIG. 1. A ski suspension 24 is disposed generally within a suspension well 34 as described above. Also seen in phantom in FIG. 2 is an engine 42 secured to chassis 12. Engine 42 is provided with exhaust ports 44 which are connected to an expansion pipe 46. Expansion pipe 46 extends over the top of engine 42 and connects with resonator 48 for noise and vibration attenuation. Resonator 48 is disposed, in the preferred embodiment, on the right-hand side of snowmobile 10 above the lower portion of belly pan 18 behind rearward face 36 of suspension well 34. In the present invention, an outlet pipe 50 is in fluid communication with resonator 48 and secured at the mid to upper portion of the front of resonator 48. Outlet pipe 50 extends through an opening 52 (see FIG. 3). Outlet pipe 50 includes a bend therein such that as it exits resonator 48, it extends forwardly but then turns downwardly as it extends through opening 52 so as to direct exhaust gases downwardly. Thus, a terminal end 54 of outlet pipe 50 opens downwardly. A deflection shield 56 is preferably secured to rearward face 36 of suspension well 34 so as to protect outlet pipe 50 and further help aid in assuring that no snow blocks terminal end 54 of outlet pipe 50. A heat shield 58 is secured to rearward face 36 of suspension well 34 below terminal end 54 of outlet pipe 50. Thus, as hot gases are expelled from outlet pipe 50, heat shield 58 protects belly pan 18, which is typically plastic.

Figure 4:
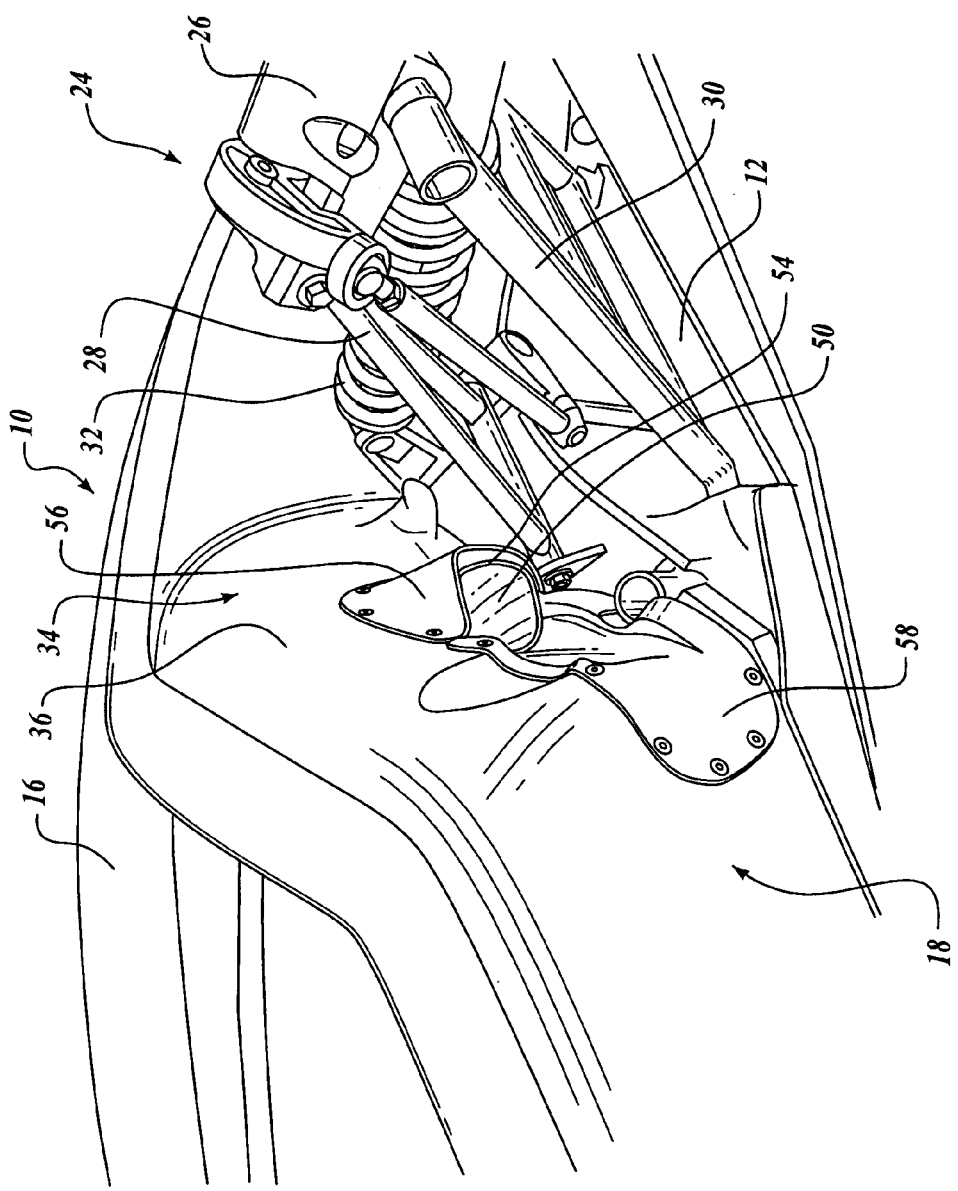
FIG. 4 is an underside perspective view of the suspension well of the snowmobile in the present invention showing the exhaust exit adjacent the front suspension arms.

FIG. 4 illustrates deflection shield 56 and heat shield 58 secured to belly pan 18. These shields, 56 and 58 are typically constructed of metal so as to resist the hot gases.

As can be noted from an examination of FIGS. 2 and 4, the terminal end 54 of outlet pipe 50 is directly adjacent ski suspension 24. Thus, movement of ski suspension 24 helps eliminate any snow from packing in against outlet pipe 50. Furthermore, the elevated positioning of outlet pipe 50 helps avoid any snow compaction over the end thereof. Furthermore, with outlet pipe 50 positioned somewhat further forward such that it is more closely aligned with spindle 26, when the ski executes a right-hand turn, the snow that would compact against outlet pipe 50 is pushed aside by ski 22 and suspension 24.

As outlet pipe 50 directs hot gases downwardly toward the snow, noise attenuation is still accomplished. Outlet pipe 50 could alternatively extend through other faces of suspension well 34. However, in the present embodiment, the rearward face is preferred as it is adjacent the positioning of resonator 48.

Thus, with the new arrangement of resonator 48 and outlet pipe 50 extending into suspension well 34, the problems encountered in deep, light snow that is further compounded with powerful snowmobiles having electronic fuel injection, are substantially eliminated. The capping-off concern is taken care of by having an elevated exhaust outlet that is further freed from any compacted snow by the movement of the suspension linkages and by the more forward positioning such that the ski creates a path through the snow during a right-hand turn.

While the preferred embodiment of the invention has been illustrated and described, as noted above, many changes can be made without departing from the spirit and scope of the invention. For example, the exhaust system may exit out the left side of the snowmobile instead of the right side. Other examples of alternate embodiments would include an exhaust outlet pipe extending out of a different portion of the suspension well rather than the rearward face. Alternate arrangements may further be possible with slightly altered suspension systems. Accordingly, the scope of the invention is not limited by the disclosure of the preferred embodiment. Instead, the invention should be determined entirely by reference to the claims that follow.

What is claimed is:

1. An exhaust system for a snowmobile having a ski suspension and an engine with exhaust ports, the exhaust system comprising:

a. a suspension well within which at least a portion of the ski suspension is disposed, said well having a face positioned adjacent of at least a portion of the ski suspension, said well having an opening formed in said face; and b. an exhaust outlet pipe in fluid communication with the exhaust ports of the engine, said outlet pipe extending through said opening formed in said face of said well.

2. The exhaust system of claim 1, wherein said face of said suspension well is a rearward face positioned adjacent to and rearward of at least a portion of the ski suspension.

3. The exhaust system of claim 1, further comprising a downwardly directed deflection shield secured within said suspension well and covering at least a portion of said exhaust outlet pipe.

4. The exhaust system of claim 1, wherein said outlet pipe extends adjacent to the ski suspension.

5. The exhaust system of claim 4, wherein said exhaust outlet pipe includes a terminal end with an opening directed downwardly.

6. The exhaust system of claim 5, further comprising a downwardly directed deflection shield secured within said suspension well and surrounding said terminal end of said outlet pipe.

7. The exhaust system of claim 6, further comprising a heat shield secured within said suspension well, below the terminal end of said outlet pipe.

8. A snowmobile comprising:
a. a chassis;
b. a body secured to said chassis, said body including a belly pan;
c. a ski suspension mounted to said chassis, wherein said belly pan forms a suspension well around at least a portion of said ski suspension;
d. an engine mounted to said chassis, said engine having an exhaust exit port;
e. an exhaust pipe mounted to said exhaust exit port;
f. a resonator secured to said chassis and in fluid communication with said exhaust pipe; and
g. an outlet pipe secured to a forward side of said resonator, said outlet pipe extending through the rearward side of said suspension well, rearward of said suspension.

9. The snowmobile of claim 8, wherein said outlet pipe includes a terminal end adjacent said ski suspension.

10. The snowmobile of claim 9, wherein said suspension well includes a rearward face behind said ski suspension, said rearward face including an opening therein through which said outlet pipe extends.

11. The snowmobile of claim 10, wherein said terminal end of said outlet pipe is directly downwardly.

12. The snowmobile of claim 11, further including a deflector shield secured to said belly pan and surrounding the portion of said outlet pipe that extends into said suspension well.

13. The snowmobile of claim 12, further comprising a heat shield secured to said belly pan below said terminal end of said outlet pipe.

14. An exhaust pipe for a snowmobile, wherein the snowmobile includes ski suspension linkages within a belly pan suspension well, an engine with an exhaust port, and an exhaust system including an expansion pipe coupled to the exhaust port and a resonator coupled to the expansion pipe, the resonator having a front side adjacent and rearward of the belly pan suspension well; the exhaust pipe comprising a pipe coupled to the front side of the resonator and extending through the belly pan to a terminal end within the suspension well adjacent the ski suspension linkages.

15. The exhaust pipe of claim 14, wherein said exhaust pipe is curved downwardly at its terminal end to channel exhaust gases downwardly between the belly pan and the ski suspension linkages.

16. The exhaust pipe of claim 15, further comprising a deflection shield at least partially surrounding the portion of said pipe that extends into said suspension well.

* * * * *